(12) United States Patent
Devine et al.

(10) Patent No.: US 7,882,028 B1
(45) Date of Patent: Feb. 1, 2011

(54) SYSTEMS AND METHODS FOR CREDIT CARD FEE CALCULATION

(75) Inventors: Michael A. Devine, Pasadena, CA (US); Todd M. Fitch, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 12/057,183

(22) Filed: Mar. 27, 2008

(51) Int. Cl.
    *G06Q 30/00* (2006.01)
(52) U.S. Cl. .............................. 705/39; 705/16; 705/17; 705/21; 705/26; 705/27; 705/41; 705/40
(58) Field of Classification Search .................... 705/16, 705/17, 21, 26, 27, 39, 40, 41
    See application file for complete search history.

(56) References Cited

U.S. PATENT DOCUMENTS

| | | | |
|---|---|---|---|
| 5,987,429 A * | 11/1999 | Maritzen et al. .............. | 705/31 |
| 2008/0021821 A1 | 1/2008 | Katyal et al. | |
| 2008/0097810 A1 | 4/2008 | Sadowski et al. | |
| 2008/0103966 A1 * | 5/2008 | Foster ......................... | 705/39 |
| 2008/0270298 A1 * | 10/2008 | McElroy et al. ............... | 705/39 |
| 2009/0063291 A1 * | 3/2009 | Robbins et al. ............... | 705/26 |
| 2009/0234748 A1 * | 9/2009 | Skowronek et al. ........... | 705/21 |

OTHER PUBLICATIONS

"Jcharge(TM) White Paper," VeriFone, Version 7.4.2, last updated Jul. 31, 2006, copyright 2006, 7 pages.
"IBM Payment Solutions," IBM, 2007, 8 pages.
"CyberSource: Credit Card Processing Strategies White Paper," CyberSource, 2000, 24 pages.
"Quickbooks Merchant Service," Intuit, Feb. 6, 2005.
"Quickbooks Merchant Service for PCs," Quickbooks, Aug. 11, 2007, 2 pages.
"From Sales to Accounting With Just One Click," Quickbooks, 2007, 2 pages.
"Sample Contracts," First USA Merchant Services, Inc., Mar. 28, 2005, 10 pages.
"Reading a 3-Tier Merchant Statement," Informed-MerchantBlog, Dec. 20, 2006, 3 pages.

* cited by examiner

*Primary Examiner*—Nga B. Nguyen
(74) *Attorney, Agent, or Firm*—Osha • Liang LLP

(57) ABSTRACT

In some embodiments, a calculation system may be used by a merchant to determine a merchant fee associated with a credit card transaction. The calculation system may consider various characteristics for the transaction to determine merchant fees associated with the transaction. For example, the calculation system may consider the relative security of the transaction, the length of time the transaction has been in an open batch, whether the credit card information is swiped or keyed in, whether address information for the transaction was verified, etc. The calculation system may analyze credit card transactions in real time and/or may analyze past merchant fee statements to determine the merchant fees associated with one or more past transactions. In some embodiments, the calculation system may be used by a card processor to analyze data from a merchant to determine a competitive rate/fee to offer the merchant.

18 Claims, 14 Drawing Sheets

| | |
|---|---|
| Transaction Amount | $1,000.00 — 601 |

1. Time
| | |
|---|---|
| Time/Date of transaction | ##/##/## ##:## — 603 |
| Time/Date of Batch Close | ##/##/## ##:## — 605 |
| Time in Open Batch (days) | 0.04 — 607 |
| Time Factor Q ≤1, M<2, N≥2 | 609 — 0 |

2. Swiped or Keyed Transaction? 611 — 0
Swiped = 0
Keyed = 1

2.1 AVS Response / Attempt 613 — 0
Y AVS response = 0
No Match / No Attempt = 1

3. Swiped or Keyed Approved? 615 — 0
Swiped Merchant = 0
Keyed Only Merchant = 1

3.1 AuthDate/ShipDate 617 — 0
Electronic Auth in Batch = 0
Voice Auth / TKTO = 1

3.2 Commercial Card : Tax & Customer 619 — 0
Electronic Auth in Batch = 0
Voice Auth / Talk To (TKTO) = 1

4. Electronic Auth 621 — 0
Electronic Auth in Batch = 0
Voice Auth / TKTO = 1

5. Travel / Rewards Card 623 — 0
Personal Card / Bank Branded
    Visa or MasterCard
Rewards / Mileage = 1

| | | |
|---|---|---|
| Rate Assessment: | 625 — | 1.59% |
| Total Fee | 627 — | $161.25 |
| Authorization Fee | 629 — | $0.20 |
| Batch Fee | 631 — | $0.25 |
| Qualified Rate | 633 — | 1.59% |
| MidQualified Rate (Use as Qualified for Keyed merchants) | 635 — | 2.77% |
| NonQualified Rate | 637 — | 3.47% |
| Total # of transactions in Batch | 639 — | 10 |
| Total Batch Amount | 641 — | $10,000 |
| Total of Other transactions in Batch | 643 — | $0.00 |

| Transaction Fee | Qualified | Mid-Qualified | Non-Qualified |
|---|---|---|---|
| Rate Assessment: | 1.59% | 2.77% | 3.47% |
| Total Fee | $16.35 | $28.15 | $35.15 |
| | 645 | 647 | 649 |

FIG. 6a

| Scenario | Resulting Fee |
|---|---|
| Close Batch within next 4 hours | Rate: 1.59% (Qualified)<br>Fee Total: $16.35 |
| Close Batch within next 24 hours | Rate: 2.77% (Mid-Qualified)<br>Fee Total: $28.15 |
| Close Batch within next 48 hours | Rate: 3.47% (Non-Qualified)<br>Fee Total: $35.15 |
| Swipe physical credit card | Rate: 1.59% (Qualified)<br>Fee Total: $16.35 |
| Key in credit card information | Rate: 3.47% (Non-Qualified)<br>Fee Total: $35.15 |
| Receive positive AVS response | Rate: 1.59% (Qualified)<br>Fee Total: $16.35 |
| Ship product within 3 days of authorization | Rate: 1.59% (Qualified)<br>Fee Total: $16.35 |
| Ship product within 6 days of authorization | Rate: 2.77% (Mid-Qualified)<br>Fee Total: $28.15 |
| Ship product within 9 days of authorization | Rate: 3.47% (Non-Qualified)<br>Fee Total: $35.15 |
| Receive electronic authorization | Rate: 1.59% (Qualified)<br>Fee Total: $16.35 |
| Credit card is commercial, travel, rewards, government, or foreign credit card. | Rate: 3.47% (Non-Qualified)<br>Fee Total: $35.15 |

651

 = Recommendation

FIG. 6b

Fee Calculator

| | | |
|---|---|---|
| Transaction Amount | 801 | $631.43 |
| Auth Fee | 803 | $0.15 |
| Batch Fee | 805 | $0.27 |

Existing Rates

| | | |
|---|---|---|
| Qual Rate | 807 | 1.66% |
| MidQual Rate (Use as Qual for Keyed merchants) | 809 | 2.66% |
| NonQual Rate | 811 | 3.05% |
| Time/Date of transaction | 813 | ##/##/## ##:## |
| Time/Date of Batch Close | 815 | ##/##/## ##:## |
| Time in Open Batch (days) | | .4521 |
| Time Factor if <2, then 0 day | 817 | 0 |
| | 819 | |
| Total # of transactions in Batch | 821 | 18 |
| Total Batch Amount | 823 | $1,394.94 |
| Total of Other Transactions in Batch | 825 | $139.80 |
| Batch Entry Method percent swiped transactions in batch | 827 | 100% |
| Swiped Merchant = 0 Keyed Only Merchant =1 | 829 | 0 |
| Swiped or Keyed Transaction? Swiped = 0 Keyed = 1 | 831 | 0 |

Proposed Fees

| | |
|---|---|
| $0.10 | 841 |
| $0.25 | 843 |

Proposed Rates

| | |
|---|---|
| 1.59% | 845 |
| 2.59% | 847 |
| 2.98% | 849 |

Merchant Current Transaction Fee — 833
Rate Assessment: 1.66%
Total Fee $10.65

Proposed Transaction Fee — 835
Rate Assessment: 1.59%
Total Fee $10.15
Savings (per transaction) $0.49

Current Batch Fee — 837
Rate Assessment: 1.66%
Total Fee $25.98

Proposed Batch Fee — 839
Rate Assessment: 1.59%
Total Fee $24.13
Savings (per batch) $1.85

*FIG. 8*

SYSTEMS AND METHODS FOR CREDIT CARD FEE CALCULATION

BACKGROUND

Credit cards may be used by customers in a transaction with a merchant as a form of payment. Card holders may set up an account with and be issued a credit card by an issuer bank. Merchants may set up an account with an acquirer bank. The card holder may present the physical credit card (for a swiped transaction) or provide the credit card information to the merchant (e.g., over the Internet for a keyed-in transaction). After the transaction is complete between the merchant and the card holder, the merchant may first receive funds for the transaction from the acquirer bank (e.g., within 1-2 days of the transaction). The issuer bank may then provide the funds for the transaction to the acquirer bank (the issuer bank and the acquirer bank may be the same entity). Merchants generally pay fees to the acquirer bank for supporting the credit card transaction. Merchant/bank fee agreements may be very lengthy such that it is often difficult for merchants to determine what the fees are for each credit card transaction. Generally, merchants may not be familiar with rates other than the rate they are initially quoted (e.g., by the acquirer bank and/or card processor). Often, the merchant must call the card processor to inquire about reasons for unexpected costs on the merchant's processing statement.

SUMMARY

In some embodiments, a calculation system may be used to determine a merchant fee for a credit card transaction and one or more characteristics of the credit card transaction that resulted in the merchant fee associated with the credit card transaction. In some embodiments, the calculation system may determine various characteristics of the transaction based on transaction information. Characteristics may include the relative security of the transaction, the length of time the transaction has been in an open batch, whether the credit card information was swiped or keyed in, whether address information for the transaction was verified, etc. The different characteristics may result in different merchant fees for the transaction. The calculation system may analyze credit card transactions in real time and/or may analyze past merchant fee statements to determine the merchant fees associated with one or more past transactions. In some embodiments, the calculation system may be used by a card processor to analyze data from a merchant to determine a competitive rate/fee to offer the merchant (e.g., based on the merchant's past transaction information). In some embodiments, the calculation system may also be used to find hypothetical or example fees for products (e.g., to be offered by the card processor) to maximize profitability. In some embodiments, the determined hypothetical or example fees may be exported (e.g., to another processing system) for forecasting, predictions, and decisions (e.g., to use in forecasting profits if the products are implemented and to assist in making decisions on whether to implement the new products).

BRIEF DESCRIPTION OF THE DRAWINGS

FIGS. 6a-d illustrate data entry panels for entry of credit card information for a transaction and scenario/recommendations for the transaction, according to an embodiment.

FIG. 8 illustrates a data entry panel for determining competitive rates/fees, according to an embodiment.

Figure 1A:
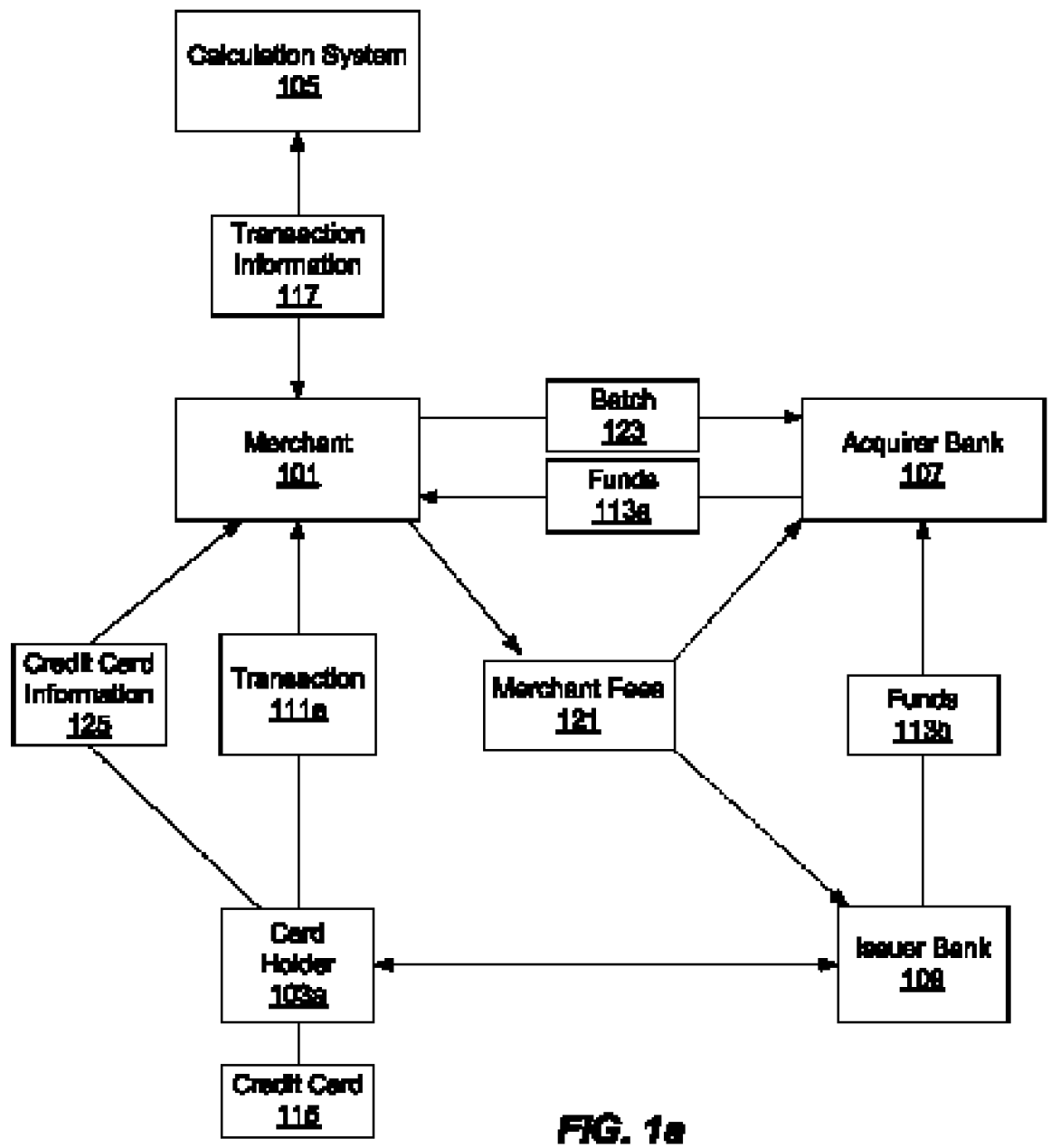
FIGS. 1a-b illustrate network diagrams for a merchant and a card holder, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF EMBODIMENTS

In some embodiments, a calculation system 105 (e.g., see FIGS. 1a-b) may be used by a merchant 101 to determine one or more merchant fees 121 associated with a credit card transaction 111 (e.g., merchant fees 121 payable by the merchant 101 to an acquirer bank 107 for supporting the transaction 111). Other merchant fees 121 are also contemplated. In some embodiments, the calculation system 105 may determine various characteristics for the transaction 111 (or multiple transactions 111) based on transaction information 117 to determine one or more merchant fees 121 associated with the transaction 111. The effect of various characteristics may be determined, for example, from a fee agreement between the merchant 101 and the acquirer bank 107. The calculation system 105 may consider characteristics such as whether credit card information 125 during a transaction 111 is swiped or keyed in, the length of time the transaction 111 has been in an open batch 123, whether address information from the card holder 103 for the transaction 111 was verified, whether an electronic authorization for the transaction 111 was received, whether the merchant 101 is approved to swipe and/or key in the transaction 111, the time between an authorization date and a shipping date, the type of credit card 115, etc. The different characteristics may result in different merchant fees 121 for the transaction 111 (e.g., see logic in FIG. 3). These merchant fees 121 may include rate-based fees determined by multiplying a transaction sale amount by the applicable rate (e.g., qualified, mid-qualified, and non-qualified) and flat fees (such as batch fees, technology fees, etc.). The calculation system 105 may analyze the transactions 111 in real time and/or may analyze past transactions 111 (e.g., from merchant fee statements) to determine the merchant fees 121 associated with the past transactions 111. Other uses of the calculation system 105 are also contemplated. For example, the calculation system 105 may be used by a card processor or other interested entity to analyze transaction information 117 from a merchant 101 to determine a competitive rate/fee 121 to offer the merchant 101 for his/her credit card business. In some embodiments, the calculation system 105 may be used to find hypothetical or example fees for products (e.g., to be offered by the card processor) to maximize profitability. In some embodiments, the determined hypothetical or example fees may be exported (e.g., to another processing system) for forecasting, predictions, and decisions (e.g., to use in forecasting profits if the products are implemented and to assist in making decisions on whether to implement the new products).

In some embodiments, the calculation system 105 may be implemented as a stand-alone application, such as one installed and executed on a terminal or desktop computer by a merchant 101. In some embodiments, the calculation system 105 may be implemented as a web-based service (e.g., over network 100) to which merchants 101 may subscribe. In some embodiments, the calculation system 105 may include both a locally installed application (i.e., a client portion) and a remote, web-based application (i.e., a server portion). For example, in one embodiment, the merchant 101 may enter transaction information 117 on a locally installed client application and then may upload the transaction information 117 to a calculation system service server for analysis and/or storage.

Figure 1B:
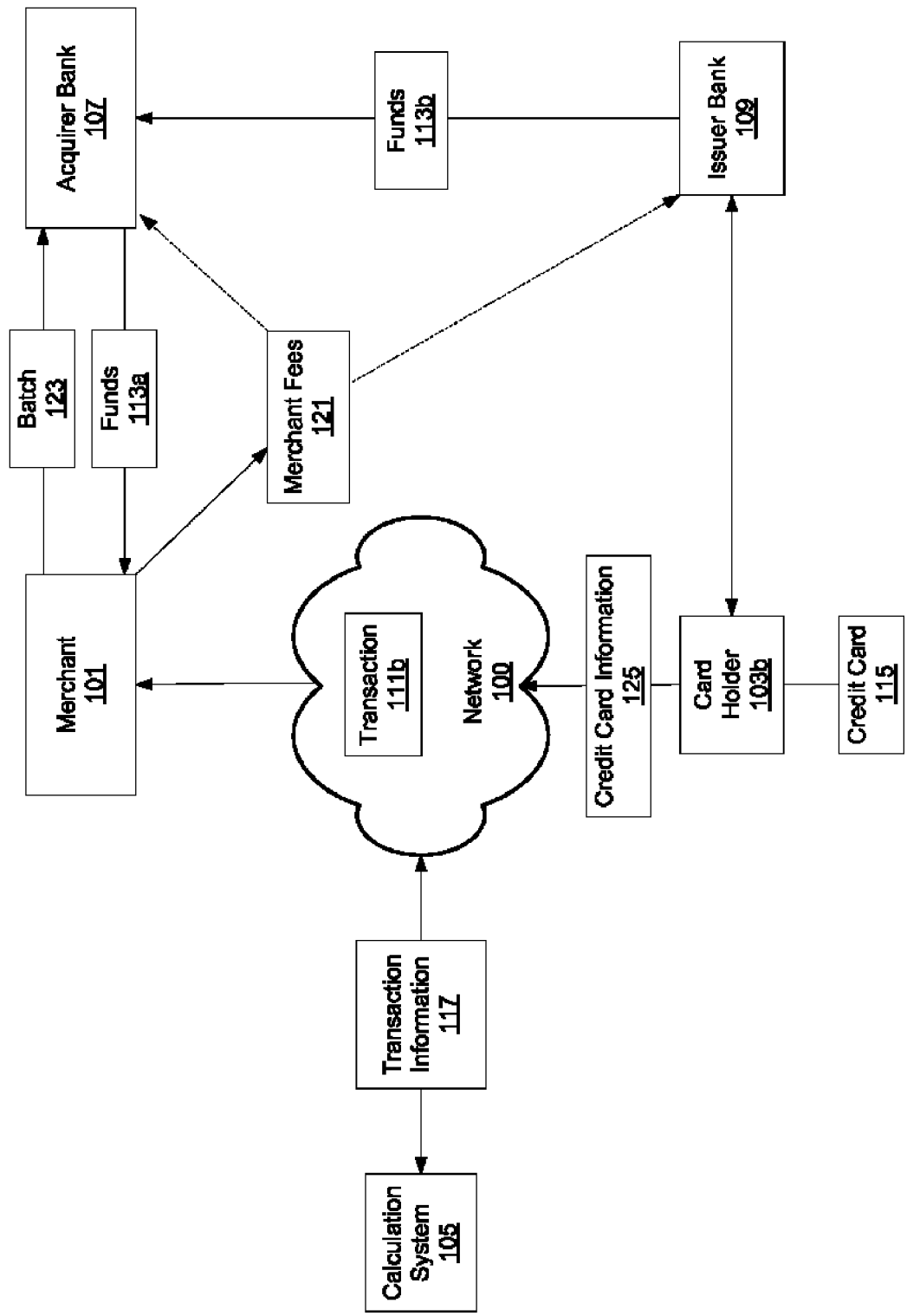

As noted above, in some embodiments, merchant fees 121 associated with credit card transactions 111 may be based in part on whether the transactions 111 are face-to-face or keyed in. FIG. 1a illustrates a face-to-face transaction 111a between a merchant 101 and card holder 103a (e.g., a face-to-face customer who is physically present at a merchant's place of business). A face-to-face transaction 111a may include the merchant 101 viewing a physical credit card 115, swiping a magnetic strip of the credit card 115, and/or receiving a signature from the card holder 103 (e.g., on a paper receipt or electronic terminal). FIG. 1b illustrates a keyed-in transaction 111b (also known as a MOTO transaction 111b (mail order/ telephone order)) between a merchant 101 and a card holder 103b. In some embodiments, the merchant 101 may receive a customer's credit card information 125 keyed in over the Internet or the merchant 101 may key in credit card information 125 received from the card holder 103 over the phone. Other keyed-in information exchanges are also contemplated (e.g., by electronic messaging, short message service (SMS), mail, etc.) In some embodiments, a face-to-face transaction 111a may become a keyed-in transaction 111b if, for example, the magnetic strip of the credit card 115 cannot be read and the merchant 101 has to key in credit card information 125.

In some embodiments, face-to-face transactions 111a may be considered more secure than keyed-in transactions 111b because the presence of a physical credit card 115 may decrease the potential for fraud (e.g., as compared to keyed-in transactions 111b which may not require that a merchant 101 see the credit card 115). Merchants 101 may receive discounted fees 121 (e.g., qualified rates) for face-to-face transactions 111a as compared to keyed-in transactions 111b (e.g., which may have non-qualified rates) because of the increased security of the face-to-face transactions 111a. Other characteristics may also be considered in determining the merchant fees 121 for a transaction 111 (111 used generically herein to refer to 111a and 111b).

When determining merchant fees 121 for a transaction 111, the calculation system 105 may also consider whether the merchant 101 received an electronic authorization and/or verified the address provided by the card holder 103. During a credit card transaction 111, the merchant 101 may request and/or receive credit card information 125 about the credit card 115 from the card holder 103. Credit card information 125 may include the credit card account number, expiration date, card holder name, card holder address (including a numeric street portion and/or a zip code), three-digit security code, etc. Upon receiving credit card information 125 from the card holder 103 during a credit card transaction 111, the merchant 101 may request address verification and/or authorization for the transaction 111 (which may pass over a network to the issuer bank 109). For address verification (e.g., to authenticate the card holder 103), the merchant 101 may request the numeric portion of the card holder's address (e.g., the numeric portion of the street and/or zip code) from the card holder 103 to send (e.g., to the respective issuer bank 109) for card holder authentication. During the electronic authorization, the merchant 101 may send, for example, the credit card account number and the amount of the transaction over a network to an issuer bank 109. Other credit card information 125 may also be sent (e.g., the expiration date). Address verification and electronic authorization may be part of the same process. The issuer bank 109 may determine if the account is valid and may compare the address information to the credit card information 125 on file for the credit card account to verify the user of the credit card 115. For example, an address verification system (AVS) may determine if there is a match between the provided address information and the address information assigned to the card holder 103. The merchant 101 may be notified if there is a match between the address information provided by the card holder 103 and the address information on file for the card holder 103. If the issuer bank 109 determines the credit card information 125 is for a valid account (and, for example, the transaction amount is not over the card holder's limit), the issuer bank 109 may send an authorization for the transaction 111 back to the merchant 101. The rate used to determine the merchant fee 121 may be at least partially dependent on whether the merchant 101 verifies the received address (e.g., using the AVS system) and whether the electronic authorization is received.

In some embodiments, the calculation system 105 may also consider that merchants 101 may pay higher fees 121 for special credit cards (e.g., travel cards, foreign cards, government cards, rewards cards, airline cards, etc.). For example, even though a face-to-face transaction 111a with a rewards card may have otherwise received a qualified rate, because the rewards card was used, the transaction 111a may default to a higher non-qualified rate (the extra fees 121 being applied to the rewards element of the card). In some embodiments, the use of a corporate card may increase a rate from a qualified rate to a non-qualified rate if information is not correctly entered for the corporate card. For example, the merchant 101 may be required to enter a subtotal and then a tax. If the merchant 101 instead first enters a total that includes the tax, the merchant 101 may be penalized with the higher rate.

In some embodiments, a qualified rate may be approximately in a range of 1.5 to 2 percent (of the transaction amount) while a non-qualified rate may be approximately in a range of 2.5 to 4 percent. Other qualified and non-qualified rates are also contemplated. Qualified and non-qualified rates may also fluctuate with the strength of the economy and/or may be affected by other characteristics. For example, smaller merchants 101 may pay a higher qualified rate than larger merchants 101 with more transactions 111. In addition, other types of rates are also contemplated (e.g., mid-qualified rates may be between qualified and non-qualified rates).

In determining merchant fees 121, the calculation system 105 may also account for flat fees such as per transaction flat fees and per batch flat fees. After a transaction 111, the merchant 101 may batch 123 the transaction 111 to receive funds 113a from the acquirer bank 107. Transactions 111 may also be grouped together and batched (submitted to the acquirer bank 107 for payment) by a merchant 101 as a group. For example, merchants 101 may batch 123 a group of transactions 111 after processing, for example, 10 transactions 111. After sending the merchant 101 funds to cover the batched transactions 111, the acquirer bank 107 may receive funds 113b for the transactions 111 from the issuer bank 109 (who may bill the card holder 103a). Because merchants 101 often pay a flat fee per batch 123, it may benefit a merchant 101 to limit the number of times the merchant batches their transactions 111. However, leaving a transaction 111 in the batch 123 (without submitting the batch 123) longer than a set time period may result in the merchant 101 being charged a higher rate fee for that transaction 111. For example, the merchant 101 may have to pay a fee 121 corresponding to a non-qualified rate (instead of a qualified rate) for a transaction 111 that was not batched for several days.

In some embodiments, the calculation system 105 may also account for other merchant fees 121. For example, merchants 101 may buy, lease, or rent credit card terminals (e.g., to receive credit card information 125). A credit card terminal may include, for example, a magnetic strip reader and/or a signature pad. In some embodiments, the cost of buying/leasing/renting the credit card terminal may also be taken into account with each credit card transaction 111 (e.g., the terminal cost/an average number of transactions 111 per terminal). Merchants 101 may also be charged a per authorization fee (e.g., by the issuer bank 109) and/or a monthly/annual fee (e.g., by the acquirer bank 107.

Figure 2:
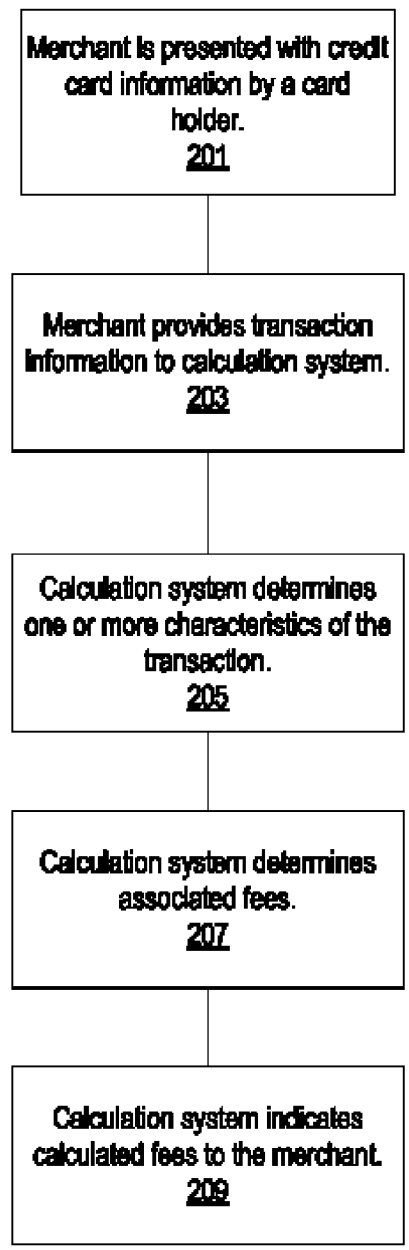
FIG. 2 illustrates a flowchart of a method for interaction between the merchant and the calculation system, according to an embodiment.

FIG. 2 illustrates a flowchart of a method for interaction between the merchant 101 and the calculation system 105, according to an embodiment. It should be noted that in various embodiments of the methods described below, one or more of the elements described may be performed concurrently, in a different order than shown, or may be omitted entirely. Other additional elements may also be performed as desired.

At 201, a merchant 101 may be presented with credit card information 125 by a card holder 103. For example, the credit card information 125 may be provided by the card holder 103 present the physical credit card 115 to the merchant 101 and/or swiping the credit card magnetic stripe through a magnetic strip reader. The physical credit card 115 and/or swipe may provide the merchant 101 with the account number, expiration date, card holder name, etc. In a keyed-in transaction 111, the card holder 103 may provide the credit card information 125 to the merchant 101 remotely (e.g., through an online payment gateway). The card holder 103 may, for example, manually enter the credit card information 125 into a user interface presented by a web site. Other information exchanges are also contemplated.

Figure 6C:
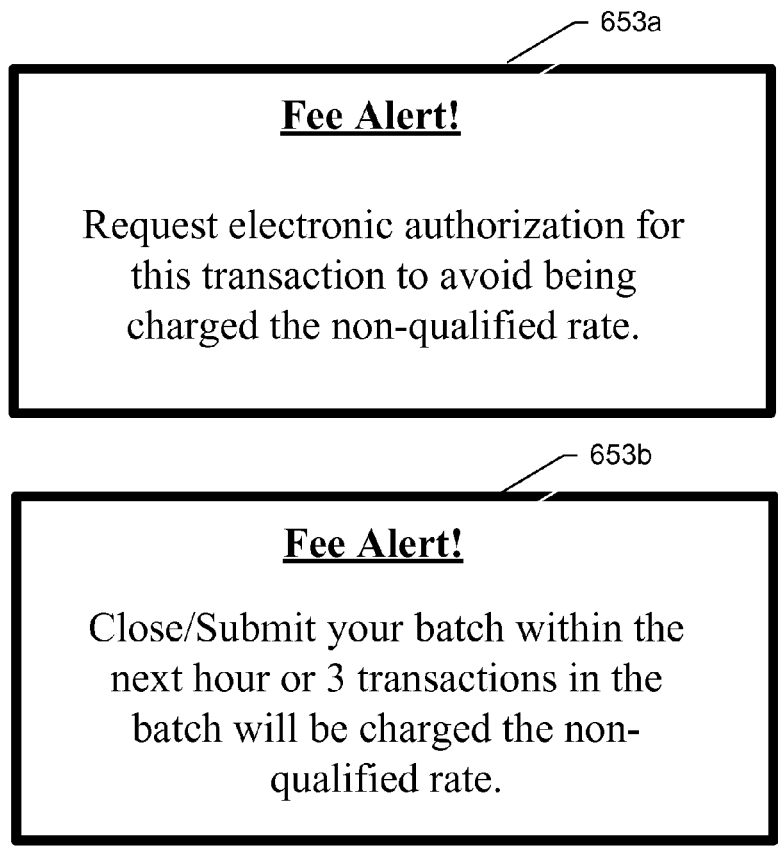

At 203, the merchant 101 may provide transaction information 117 (which may include at least part of the credit card information 125 and/or other information about the transaction 111) to the calculation system 105. The calculation system 105 may be resident on the merchant's payment system (e.g., on the credit card terminal) such that at least a part of the transaction information 117 may be automatically received by the calculation system 105. In some embodiments, the transaction information 117 may be entered into a user interface (e.g., see FIGS. 6a-b and 9) by the merchant 101. In some embodiments, the transaction information 117 may be uploaded by a merchant 101. For example, the merchant 101 may subscribe to a service providing the calculation system 105 and the merchant 101 may upload a previous credit card fee bill to the calculation system 105 for analysis (as part of the service subscription). In some embodiments, the calculation system 105 may be provided through a web site and the merchant 101 may upload the previous credit card fee bill to the calculation system 105 through the web site for analysis. Other uploads are also contemplated. In some embodiments, the merchant 101 may provide the transaction information 117 to a card processor who may enter the transaction information 117 into the calculation system 105 for analysis (e.g., to determine a competitive rate to offer the merchant 101). Other methods for providing the transaction information 117 to the calculation system 105 are also contemplated.

At 205, the calculation system 105 may determine one or more characteristics of the transaction 111 based on the received transaction information 117. Characteristics may include, for example, whether credit card information 125 during a transaction 111 is swiped or keyed in, the length of time the transaction 111 has been in an open batch 123, whether address information from the card holder 103 for the transaction 111 was verified, whether an electronic authorization for the transaction 111 was received, whether the merchant 101 is approved to swipe and/or key in the transaction 111, the time between an authorization date and a shipping date, the type of credit card 115, etc.

At 207, the calculation system 105 may determine the associated merchant fees 121 based on the one or more characteristics. In some embodiments, the calculation system 105 may use logic (e.g., as presented in FIGS. 3a-b) to determine one or more of the merchant fees 121 (e.g., including rate determined fees 121) for the credit card transaction 111 (including, for example, batch fees, technology fees, etc.). The logic may include, for example, if/then statements to determine different criteria that may affect the merchant fee 121. The logic may also apply one or more transaction/batch fees.

At 209, the calculation system 105 may indicate the calculated merchant fees 121 to the merchant 101. For example, the calculation system 105 may display the calculated merchant fees 121 to the merchant 101 on a terminal display, a computer system display, etc. In some embodiments, the calculation system 105 may display one or more of the characteristics that resulted in the calculated merchant fee 121. In some embodiments, the calculation system 105 may indicate an alert and/or recommendation to the merchant 101 in addition to or in place of the merchant fee 121. In some embodiments, data such as the calculated merchant fees 121, one or more characteristics, etc. may be saved and/or exported (e.g., to another processing system of the merchant 101) for historical or forecasting purposes. For example, the merchant 101 may consult the stored calculated merchant fees 121 and one or more characteristics to approximate the merchant's processing bill for the next month, year, etc. The merchant 101 may also analyze the stored calculated merchant fees 121 and one or more characteristics to find ways to reduce future fees.

Figure 3A:
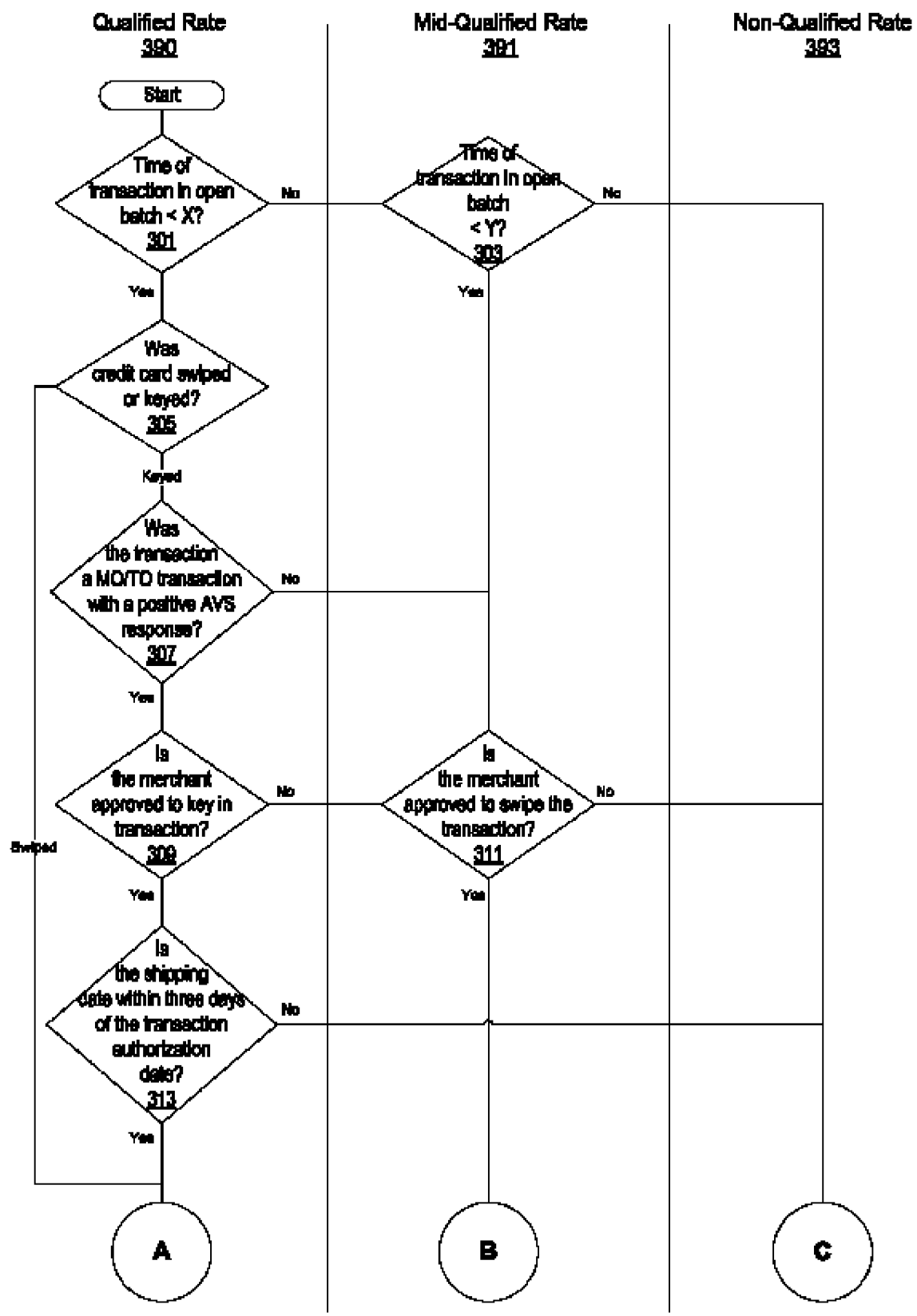
FIGS. 3a-b illustrate a flowchart for fee calculation, according to an embodiment.
Figure 3B:
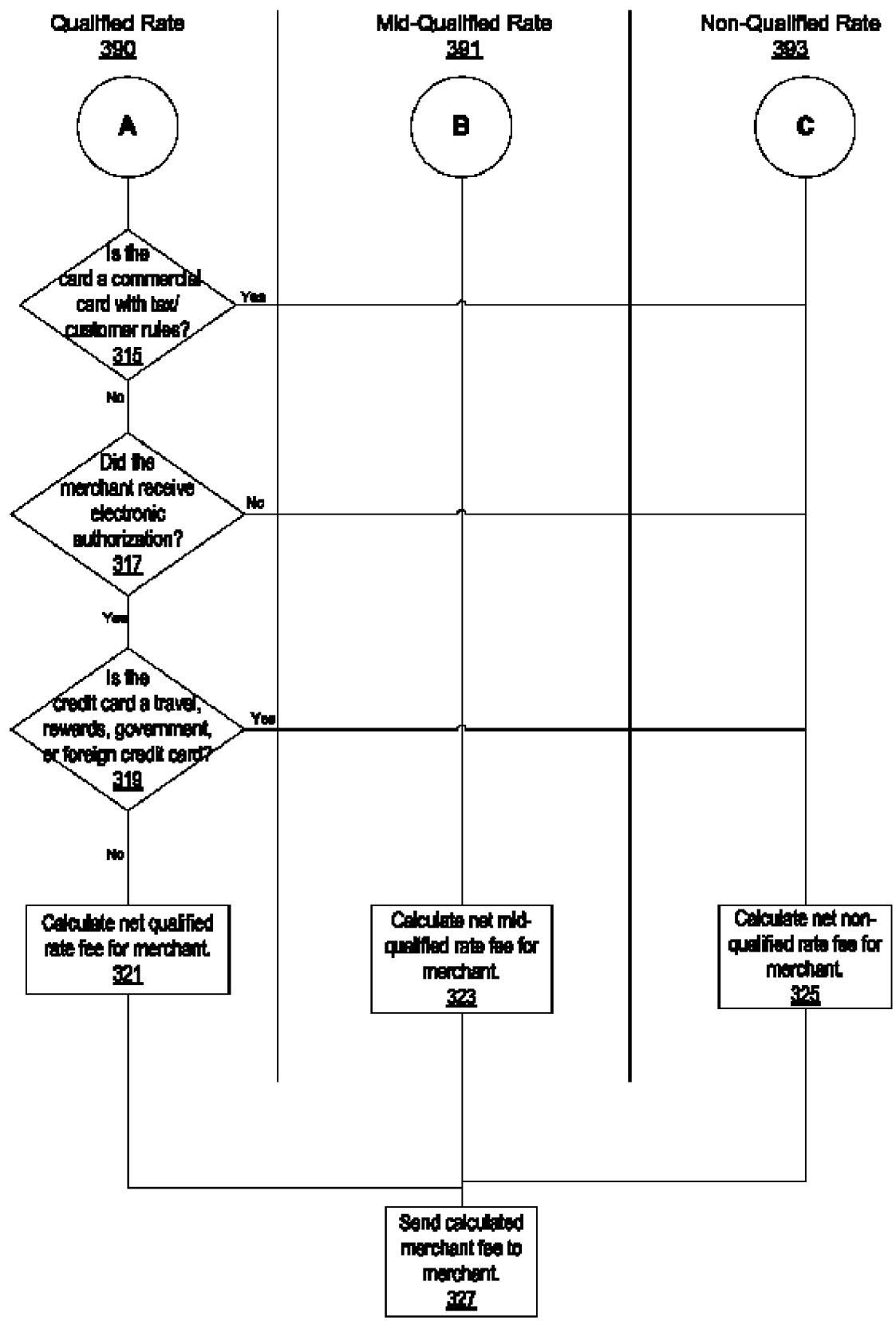

FIGS. 3a-b illustrates a flowchart of a method for merchant fee calculation, according to an embodiment. As shown in FIGS. 3a-b, different characteristics may move an applicable rate into or out of a qualified rate 390, mid-qualified rate 391, or non-qualified rate 393 category. The terms qualified rate 390, mid-qualified rate 391, or non-qualified rate 393 and logic shown are exemplary only. Other terms and logic flows are also contemplated. In some embodiments, the logic presented in FIGS. 3a-b may be used by the calculation system 105 to determine one or more merchant fees 121 for a corresponding transaction 111. It should also be noted that in various embodiments of the methods described below, one or more of the elements described may be performed concurrently, in a different order than shown, or may be omitted entirely. Other additional elements may also be performed as desired.

At 301, a determination may be made as to whether the transaction 111 was in an open batch 123 for greater than a first predetermined time period. In some embodiments, the first predetermined time period may be one day. Other first predetermined time periods are also contemplated. For example, if the transaction 111 was in an open batch 123 without being submitted to the acquirer bank 107 for longer than 24 hours after the transaction 111 was completed with the card holder 103, the merchant 101 may not receive a qualified rate 390 (even if the transaction 111 would have otherwise qualified for the qualified rate 390). If the transaction 111 was not in the open batch 123 longer than the first predetermined time period, flow may continue in the qualified rate path to 305.

At 303, if the transaction 111 was in the batch 123 longer than the first predetermined time period, a determination may be made as to whether the transaction 111 was in the open batch 123 longer than a second predetermined time period. In some embodiments, the second predetermined time period may be two days. Other predetermined time periods are also contemplated. If the transaction 111 was not in the open batch 123 longer than the second predetermined time period, flow may continue in the mid-qualified rate path to 311. If the transaction 111 was in the open batch 123 longer than the second predetermined time period, flow may continue in the non-qualified rate path to 325.

At 305, a determination may be made as to whether the credit card 115 is swiped or the credit card information 125 is keyed in. If the credit card 115 is swiped (such as in a face-to-face transaction 111), flow may continue at 315. If the credit card information 125 is keyed in (e.g., credit card information 125 received by the merchant 101 over the Internet, phone, mail, etc.), flow may continue at 307.

At 307, a determination may be made as to whether the transaction 111 is a MOTO transaction 111 with a positive AVS response (indicating that the address provided by the card holder 103 matches the address on file for the card holder 103). In some embodiments, an AVS verification may be performed by the merchant 101 sending the card holder's zip code and/or first numerical portion of the card holder's street address to an AVS system (e.g., located remotely to the merchant 101). If the provided zip code and/or numerical portion matches the address information on file for the card holder, a positive AVS response may be delivered to the merchant 101. Otherwise, a negative AVS response may be delivered. If the transaction 111 is not a MOTO transaction 111 with a positive AVS response (e.g., if the merchant 101 did not conduct an address verification or if the address provided did not match the address on file) the merchant 101 may receive a higher rate and flow may continue at 311. If the transaction 111 is a MOTO transaction 111 with a positive AVS response, flow may continue at 309.

At 309, a determination may be made as to whether the merchant 101 is approved to key in the transaction 111. Merchants 101 may have to receive prior approval from their credit card processor/acquirer bank 107 and/or have access to, for example, an online payment gateway to key in transactions 111. If the merchant 101 is not approved to key in the transaction 111, the merchant 101 may receive a higher rate and flow may proceed to 311. If the merchant 101 is approved to key in the transaction 111, flow may proceed to 313.

At 311, a determination may be made as to whether the merchant 101 is approved to swipe the transaction 111. For example, the merchant 101 may need a credit card terminal (e.g., bought or leased) that has a magnetic strip reader to process swiped transactions 111a. If the merchant 101 is not approved to swipe the transaction 111, the merchant 101 may receive a still higher rate and flow may proceed to 325. If the merchant 101 is approved to swipe the transaction 111, flow may proceed to 323.

At 313, a determination may be made as to whether a shipping date is within a predetermined time (e.g., three days) of a transaction authorization date (e.g., when the merchant 101 received electronic authorization for a transaction 111). If the shipping date is not within the predetermined time, flow may proceed to 325. If the shipping date is within the predetermined time, flow may proceed to 315.

At 315, a determination may be made as to whether the credit card 115 is a commercial card with tax/customer rules. If the credit card 115 is a commercial card with tax/customer rules the merchant 101 may have to pay a higher rate and flow may proceed to 325. If the credit card 115 is not a commercial card with tax/customer rules, flow may proceed to 317.

At 317, a determination may be made as to whether the merchant 101 received electronic authorization. For example, the merchant 101 may send received credit card information 125 to an issuer bank 109 who may verify the identify and status (e.g., credit card 115 not reported stolen, card holder 103 is still below the maximum spending limit of the credit card 115, etc.) of the card holder 103. If the issuer bank 109 verifies the identity and/or status of the card holder, the issuer bank 109 may provide an authorization to the merchant 101 at the time of the transaction 111. Otherwise, the issuer bank 109 may not approve the transaction 111 and the merchant 101 may optionally reject the credit card 115. If the merchant 101 did not receive electronic authorization for the transaction 111, flow may proceed to 325. If the merchant 101 received electronic authorization for the transaction 111, flow may proceed to 319.

At 319, a determination may be made as to whether the credit card 115 is a travel card, rewards card, government card, or foreign credit card 115. If the credit card 115 is a travel card, rewards card, government card, or foreign credit card, the merchant 101 may receive a higher rate and flow may proceed to 325. If the credit card 115 is not a travel card, rewards card, government card, or foreign credit card, flow may proceed to 321.

At 321, the net qualified rate fee 121 may be determined for the merchant 101. The merchant 101 may thus qualify for an optimum rate. Other considerations may also be taken into account to qualify for the optimum rate.

At 323, a net mid-qualified rate fee 121 may be determined for the merchant 101. The merchant 101 may not qualify for the optimum rate, but may qualify for a rate that is better than the worst rate.

At 325, a net non-qualified rate fee 121 may be determined for the merchant 101. The merchant 101 may thus receive a higher rate. For example, the transaction 111 may have one or more characteristics that qualify the transaction 111 as a higher-risk transaction 111. Because the acquirer bank is taking on more risk by backing the transaction 111, the acquirer bank 107 may charge the higher rate.

At 327, the calculated merchant fee 121 may be sent to the merchant 101. In some embodiments, the merchant fee 121 may equal the transaction amount times the applicable rate (qualified, mid-qualified, or non-qualified)+authorization fee+(Header fee/count of transactions in batch 123)+(share of technology lease or subscription fee). The authorization fee may be a fee charged by the issuer bank 109 to verify the credit card information 125 during the transaction 111 (for the electronic authorization). In some embodiments, a voice authorization fee (e.g., $2.00) may be charged per transaction if the electronic authorization fails and voice authorization is requested. The header fee (also known as the batch fee) may be a flat fee charged to the merchant 101 each time the merchant 101 submits a batch 123 of transactions 111 for processing (e.g., to the acquirer bank 107) to receive funds. The count of transactions 111 in the batch 123 may be the number of transactions 111 in the batch 123 when the merchant 101 submits the batch 123 for processing. The share of technology lease or subscription fee may be a fee associated with the merchant's lease, purchase, or subscription for a credit card terminal and/or online payment gateway. Other fees are also contemplated. Other equations for the merchant fee 121 are also contemplated.

Figure 4:
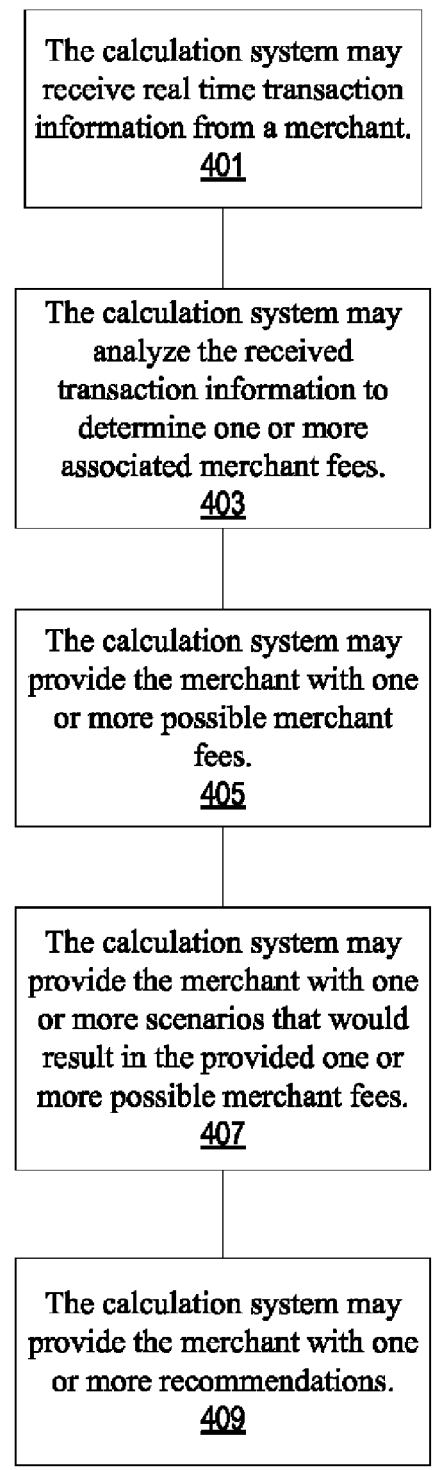
FIG. 4 illustrates a flowchart of a method for real time fee calculation, according to an embodiment.

FIG. 4 illustrates a flowchart of a method for real time fee calculation, according to an embodiment. It should be noted that in various embodiments of the methods described below, one or more of the elements described may be performed concurrently, in a different order than shown, or may be omitted entirely. Other additional elements may also be performed as desired.

At 401, the calculation system 105 may receive real time transaction information 117 from a merchant 101. The transaction information 117 may include information (e.g., credit card information 125 and/or other information) for a current transaction 111 and/or past credit card transactions 111 (e.g., transactions 111 in an open batch 123). The calculation system 105 (and/or component of the calculation system 105) may be resident on the merchant's payment system (e.g., on the credit card terminal) such that at least part (e.g., the credit card information 125) of the transaction information 117 may be automatically received by the calculation system 105. In some embodiments, the credit card information 117 may be entered into a user interface (e.g., see FIGS. 6a and 9) by the merchant 101. Other real-time transaction information transfers are also contemplated. In some embodiments, the merchant 101 may enter at least part of the transaction information 117 into the calculation system 105 prior to the transaction 111. For example, the qualified rate, mid-qualified rate, and non-qualified rate for the merchant 101, whether the merchant 101 is approved to swipe/key in transactions 111, etc. may be entered in the calculation system 105 (e.g., local application date entry or when setting up an account on a web application with the calculation system 105). The calculation system 105 may use the pre-entered transaction information 117 when analyzing other transaction information 117 as it is received. As used herein, "real time" may include information and/or processing that occurs while a transaction 111 is pending (e.g., before the close of a sale while a merchant 101 still has time to reject the credit card 115).

For example, the merchant 101 may provide transaction information 117 including transaction amount 601, time/date of transaction 603, time/date of batch close 605, time in open batch 607, time factor 609, swiped or keyed-in 611, AVS response/attempt 613, swiped or keyed-in approved 615, authorized date versus shipping date 617, commercial card 619, electronic authorization 621, and whether the card is a travel/rewards card 623. Other transaction information 117 is also contemplated. For example, the merchant 101 may provide the authorization fee 629, the batch fee 631, the qualified rate 633, the mid-qualified rate 635, the non-qualified rate 637, the number of transactions in the batch 639, the total batch amount 641, and the total of other transactions in the batch 643. In some embodiments, the merchant 101 may enter one or more of these values into an input form (e.g., presented by a local application or a web-based application). In some embodiments, some or all of the transaction information 117 may be pre-populated into the form by an application intercepting transaction information 117, for example, from a credit card terminal or online payment gateway. Other sources and other information is also contemplated.

At 403, the calculation system 105 may analyze the received transaction information 117 to determine one or more associated merchant fees 121 (e.g., the applicable rate 425 and total fee 427). In some embodiments, the calculation system 105 may analyze transaction information 117 for a pending transaction 111. For example, the calculation system 105 may be part of the credit card terminal or online payment gateway receiving credit card information 125 for a transaction 111 that is currently pending. The calculation system 105 may also analyze past transactions 111 (e.g., transactions 111 in the merchant's open batch 123, transactions 111 on a past merchant bill, etc.). In some embodiments, determining one or more associated merchant fees 121 may include determining one or more characteristics based on the transaction information 117 and determining the one or more associated merchant fees 121 based on the effect of the characteristics on, for example, the rate (e.g., qualified, non-qualified, etc.) applied to the transaction 111 to determine the merchant fee 121.

At 405, the calculation system 105 may provide the merchant 101 with one or more possible merchant fees 121 (e.g., fee 645, fee 647, and fee 649). At 407, the calculation system 105 may provide the merchant 101 with one or more scenarios that would result in the provided one or more possible merchant fees 121. The calculation system 105 may calculate the merchant fee 121 for one or more scenarios (e.g., one or more scenarios that may result in different characteristics for the transaction 111). Scenarios may include swipe credit card 115, ask for card holder's address, process according to tax/customer rules, request electronic authorization, etc. In some embodiments, the merchant 101 may also choose to accept or refuse a transaction 111 (e.g., for no merchant fee 121) based on the possible merchant fees 121 and scenarios provided by the calculation system 105 (e.g., if provided during the transaction 111). Scenarios may also be provided independent of the current transaction 111. For example, the calculation system 105 may provide the merchant 101 with scenarios (and associated fees 121) for closing the batch now versus closing the batch later. Other scenarios are also contemplated.

For example, the calculation system 105 may calculate the merchant fee 121, using the received transaction information 117 for the transaction 111 if the merchant 101 swipes the transaction 111, keys in the transaction 111, receives an electronic authorization, does not receive an electronic authorization, etc. As another example, the calculation system 105 may calculate the merchant fee 121, using the received transaction information 117 for the transaction 111 if the merchant 101 submits the batch immediately after the transaction 111, submits the batch 4 hours after the transaction 111, 24 hours after the transaction 111, 48 hours after the transaction 111, etc. These scenarios and associated merchant fees 121 may be displayed to the merchant 101 (e.g., see FIG. 6b).

At 409, the calculation system 105 may provide the merchant 101 with one or more recommendations (e.g., based on the provided scenarios and associated fees 121). For example, the calculation system 105 may recommend to the merchant 101 that the merchant 101 swipe the credit card 115, request authorization, and close the batch within 4 hours to prevent higher merchant fees 121 from being incurred. Other recommendations are also contemplated. The recommendations may be presented in the form of highlighted scenarios 651 or may be express. For example, the recommendations may be presented in the form of alerts (e.g., see alerts 653a-b in FIG. 6c). For example, if the transaction 111 has a characteristic that may result in a higher merchant fee, the calculation system 105 may present an alert (e.g., a pop-up window alert 653) that alerts the merchant 101 of the possible higher merchant fee 121. For example, the alert 653 may recommend the merchant 101 request electronic authorization or close the batch within the next hour. Other alerts are also contemplated.

Figure 5:
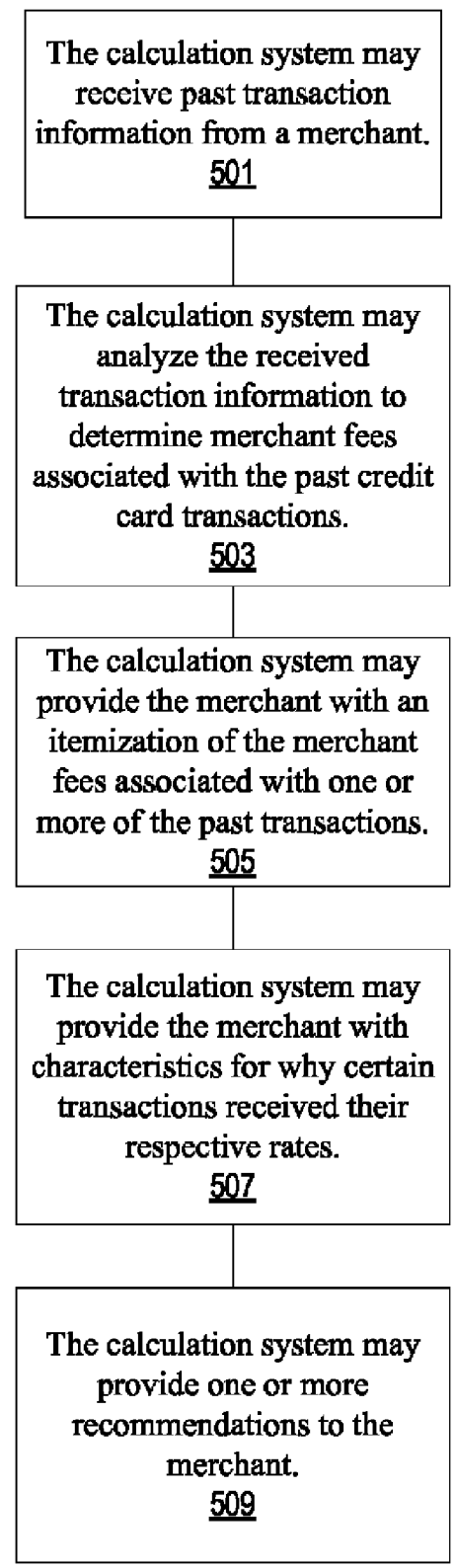
FIG. 5 illustrates a flowchart of a method for past transaction fee analysis, according to an embodiment.

FIG. 5 illustrates a flowchart of a method for past transaction fee analysis, according to an embodiment. It should be noted that in various embodiments of the methods described below, one or more of the elements described may be performed concurrently, in a different order than shown, or may be omitted entirely. Other additional elements may also be performed as desired.

At 501, the calculation system 105 may receive past transaction information 117 from a merchant 101. For example, the transaction information 117 may include transaction information 117 from past credit card transactions 111 (e.g., from a downloaded merchant fee bill). The merchant 101 may provide the past credit card transaction information 117 to a local application component (e.g., executing as part of the merchant's financial software), upload the past credit card transaction information 117 to a web service (e.g., upload the merchant's past credit card bill to an independent web service or an application operating in conjunction with an online payment gateway), or provide the past credit card transaction information 117 to a locally installed application (i.e., a client portion) which may provide the transaction information 117 to a remote, web-based application (i.e., a server portion). Other past transaction information transfer methods are also contemplated.

At 503, the calculation system 105 may analyze the received transaction information 117 to determine merchant fees 121 associated with the past credit card transactions 111. For example, the calculation system 105 may apply logic (e.g., as seen in FIGS. 3a-b) to one or more of the past credit card transactions 111 to determine an itemization of the merchant fees 121 associated with each transaction 111. For example, the logic may determine why a merchant fee 121 was charged with a non-qualified rate instead of a qualified rate.

At 505, the calculation system 105 may provide the merchant 101 with an itemization of the merchant fees 121 associated with one or more of the past transactions 111. For example, the merchant fees 121 may include the rate fee, batch fee, technology fee, etc.

Figure 6D:
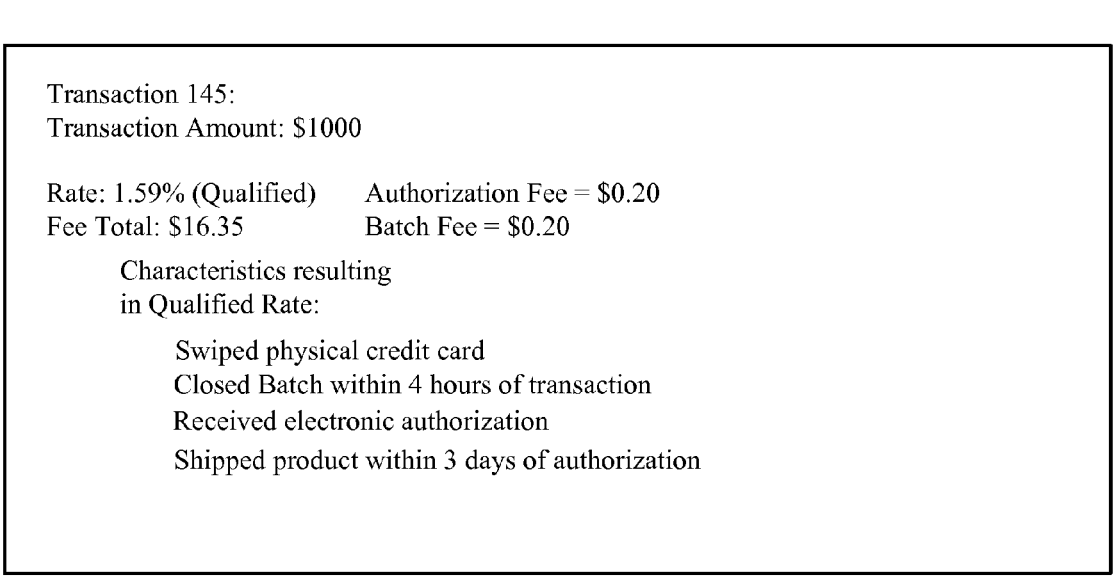

At 507, the calculation system 105 may provide the merchant 101 with characteristics indicating why certain transactions 111 received their respective rates (e.g., why one transaction 111 received a qualified rate while another transaction 111 received a non-qualified rate) (e.g., see FIG. 6d). The itemization may also include the rate type and the characteristic of the transaction 111 that led to the particular rate type being assigned (e.g., the transaction 111 remained in the batch more than 2 days, the transaction 111 was keyed-in, etc.). Other characteristics may include, for example, failure to receive AVS verification, keyed-in transaction 111 instead of swipe, etc.

At 509, the calculation system 105 may provide one or more recommendations to the merchant 101. For example, the calculation system 105 may analyze characteristics of the merchant's past transactions to determine how the merchant 101 can qualify for better rates. For example, analysis of the past characteristics may reveal that the merchant 101 often closes the batch 2-3 days after one or more transactions 111 occurred in the batch (resulting in a higher rate for these transactions 111). The calculation system 105 may thus recommend to the merchant 101 that the merchant close the batch at a minimum every 24 hours. As another example, the calculation system's analysis may determine that several transactions 111 involve foreign cards (which may result in a higher rate). The calculation system 105 may recommend the merchant 101 stop accepting foreign cards. Other recommendations are also contemplated.

In some embodiments, the calculation system 105 may predict fees for future transactions based, for example, on patterns of the past transaction data. For example, if the merchant 101 usually swipes credit cards and/or receives AVS verification, the calculation system 105 may forecast fees for the next processing period for the merchant 101 based on an average number of transactions and the fees/rates incurred by the merchants 101 past characteristics of swiping credit cards and receiving AVS verification. The calculation system 105 may also display different fee forecasts based on whether the merchant 101 implements the calculation system's recommendations. For example, a fee forecast based on an average number of transactions from past transaction periods and based on the merchant 101 receiving AVS verification for most of the transactions (e.g., where in the past the merchant 101 did not receive AVS verification) may show the merchant 101a potential savings over the next processing period if the merchant 101 will receive AVS verification for the transactions. Other fee forecasts are also contemplated.

Figure 7:
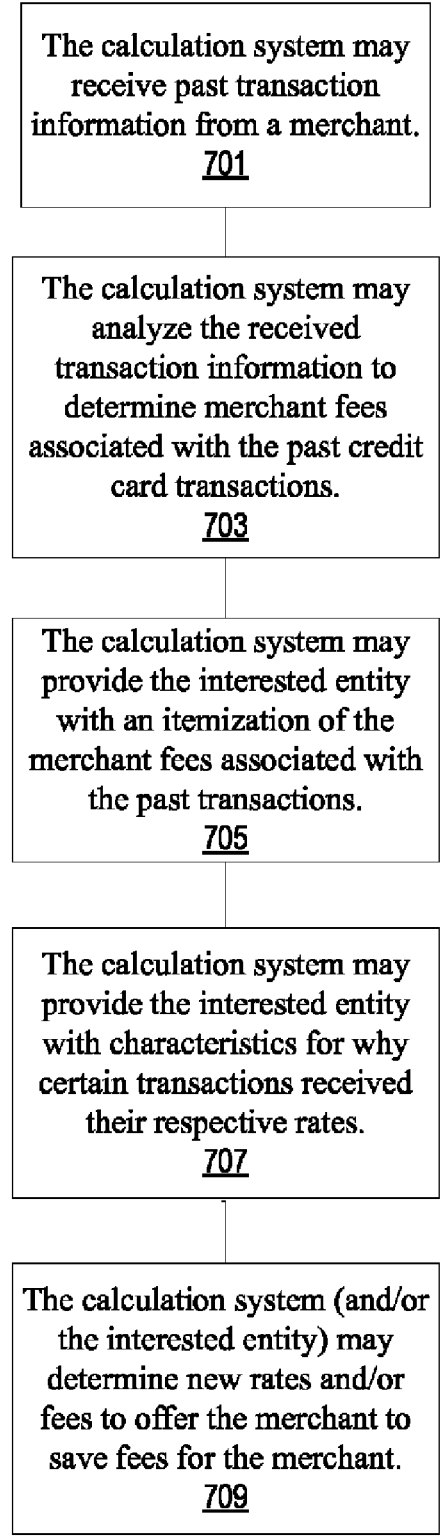
FIG. 7 illustrates a flowchart of a method for past transaction fee analysis for offering a merchant a competitive rate/fee, according to an embodiment.

FIG. 7 illustrates a flowchart of a method for past transaction fee analysis for offering a merchant 101a competitive rate/fee, according to an embodiment. It should be noted that in various embodiments of the methods described below, one or more of the elements described may be performed concurrently, in a different order than shown, or may be omitted entirely. Other additional elements may also be performed as desired.

At 701, the calculation system 105 may receive past transaction information 117 from a merchant 101 (e.g., uploaded, emailed, scanned, etc.). For example, the transaction information 117 may include transaction information 117 for past credit card transactions 111 provided to an interested entity such as a potential acquirer bank 107 or other institution interested in the merchant's credit card business. Transaction information 117 (e.g., transaction amounts 801, past authorization fee 803, past batch fee 805, past qualified rate 807, past mid-qualified rate 809, non-qualified rate 811, time/date of transactions 813, time/date of batch closings 815, time in open batch 817, time factors 819, total transactions in batch 821, total batch amount 823, total of other transactions in the batch 825, batch entry methods 827, swiped/keyed merchant 829, swiped/keyed transactions 831) for the past transactions 111 may be entered into one or more editable fields (e.g., by the calculation system 105 and/or interested entity). In some embodiments, the entry fields may be drop down boxes that include data for several past transactions 111. In some embodiments, the entry fields may be cycled through for several transactions 111 (e.g., cycle through multiple panels that each have data for a particular transaction 111 or group of transactions 111).

At 703, the calculation system 105 may analyze the received transaction information 117 to determine merchant fees 121 (e.g., based on characteristics of the transaction information 117) associated with the past credit card transactions 111. The calculation system 105 may apply logic (e.g., as seen in FIGS. 3*a-b*) to one or more of the past credit card transactions 111 to determine an itemization of the merchant fees 121 associated with the transactions 111. The logic may determine, for example, why a merchant fee 121 was charged with a non-qualified rate instead of a qualified rate.

At 705, the calculation system 105 may provide the interested entity with an itemization of the merchant fees 121 associated with the past transactions 111. The merchant fees 121 may include, for example, the current rate fee 833, current batch fee 837, technology fee, etc.

At 707, the calculation system 105 may provide the interested entity with characteristics indicating why certain transactions 111 received their respective rates (e.g., why one transaction 111 received a qualified rate while another transaction 111 received a non-qualified rate). The characteristics may include, for example, failure to receive AVS certification, keyed-in transaction 111 instead of swipe, etc. Other characteristics are also contemplated. The itemization may also include the rate type and the characteristic of the transaction 111 that led to the particular rate type being assigned (e.g., the transaction 111 remained in the batch more than 2 days, the transaction 111 was keyed-in, etc.).

At 709, the calculation system 105 (and/or the interested entity) may determine new rates and/or fees (e.g., proposed rate 835 and proposed batch fee 839) to offer the merchant 101 to save fees 121 for the merchant 101 (e.g., see FIG. 8). In some embodiments, the calculation system 105 may use trial and error with rates and fees to determine a rate/fee combination that saves the merchant 101*a* desired amount (e.g., the desired amount may be entered by the interested entity). In some embodiments, the interested entity may enter rates and/or fees (e.g., entry fields 841-849) to determine a rate/fee combination that saves the merchant 101*a* desired amount. Other rate/fee combination calculations are also contemplated. In some embodiments, the calculation system 105 may include a spreadsheet with the calculation system logic.

In some embodiments, the calculation system 105 may also be used to find hypothetical or example fees for products (e.g., to be offered by the card processor) to maximize profitability. For example, the card processor may use the calculation system 105 with the past transaction data for one or more merchants 101 to determine the potential profit of adding a fee or increasing a rate. For example, the calculation system 105 may determine the potential profit to the processor if the fee or rate increase had been implemented during the period of time of the past transaction data. In some embodiments, the determined hypothetical or example fees may be exported (e.g., to another processing system) for forecasting, predictions, and decisions (e.g., to use in forecasting profits if the products are implemented and to assist in making decisions on whether to implement the new products). For example, the processing system may compare the hypothetical fee structure to other known fee structures (e.g., offered by competitors) to approximate the cost difference to the merchant 101 and predict potential changes in merchant subscriptions (e.g., approximate a number of merchants 101 who may leave the processor for a competitor if the new fee structure is implemented). Other uses for the calculation system 105 are also contemplated.

Figure 9:
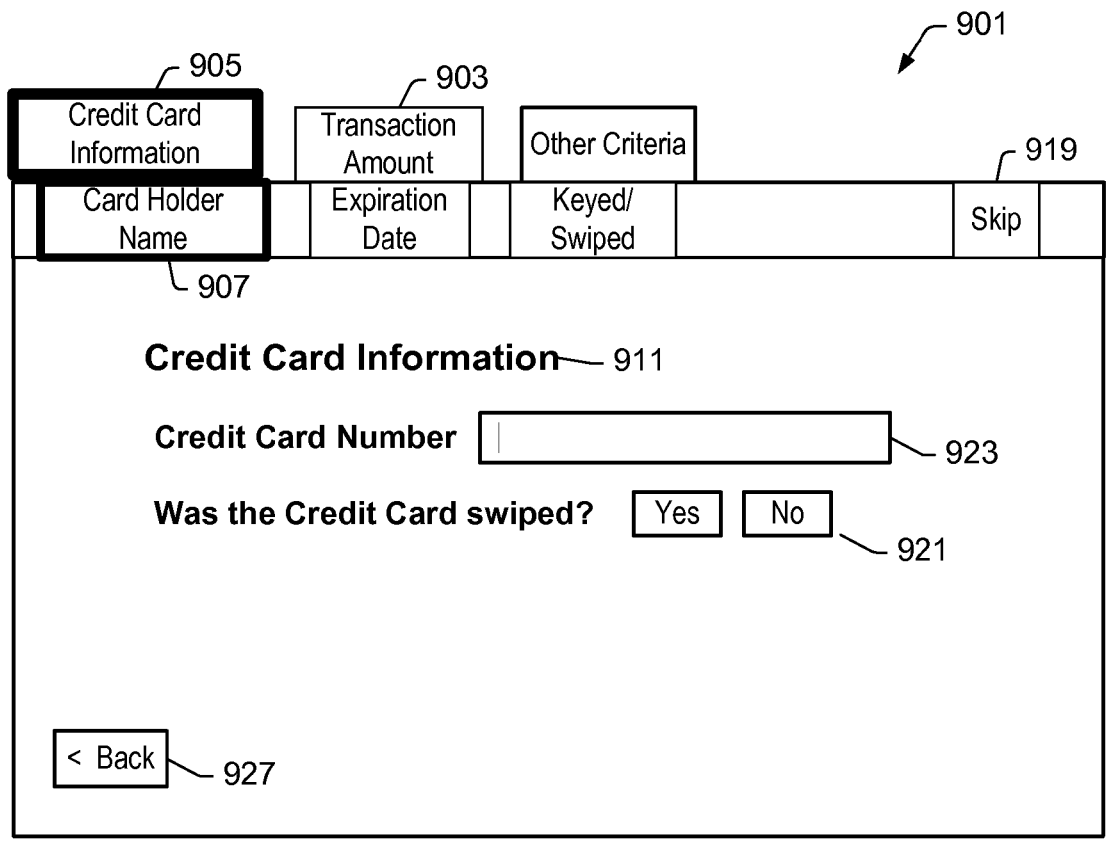
FIG. 9 illustrates a graphical user interface, according to an embodiment.

FIG. 9 illustrates a graphical user interface, according to an embodiment. In some embodiments, a merchant 101 may use the graphical user interface (e.g., presented to the merchant 101 through a display) with one or more main tabs (e.g., tabs 903 and 905) associated with one or more sub-tabs (e.g., see sub-tab 907). The merchant 101 may navigate through the graphical user interface by clicking on a main tab or sub tab (e.g., through a mouse manipulated cursor). The merchant 101 may also use a "Skip" tab 919 to move forward or a "Back" tab 927 to move backward through the search options. In some embodiments, the graphical user interface may include interface options for entering transaction information 117. For example, the transaction amount, transaction date, credit card information 911 (e.g., credit card account number 923), etc. may be entered into the graphical user interface. Other information may also be entered (e.g., ship date, keyed-in transaction/swiped transaction 921, etc.). In some embodiments, the graphical user interface may be used to upload transaction information 117 (e.g., to upload a merchant fee bill). Other graphical user interface options are also contemplated.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Figure 10:
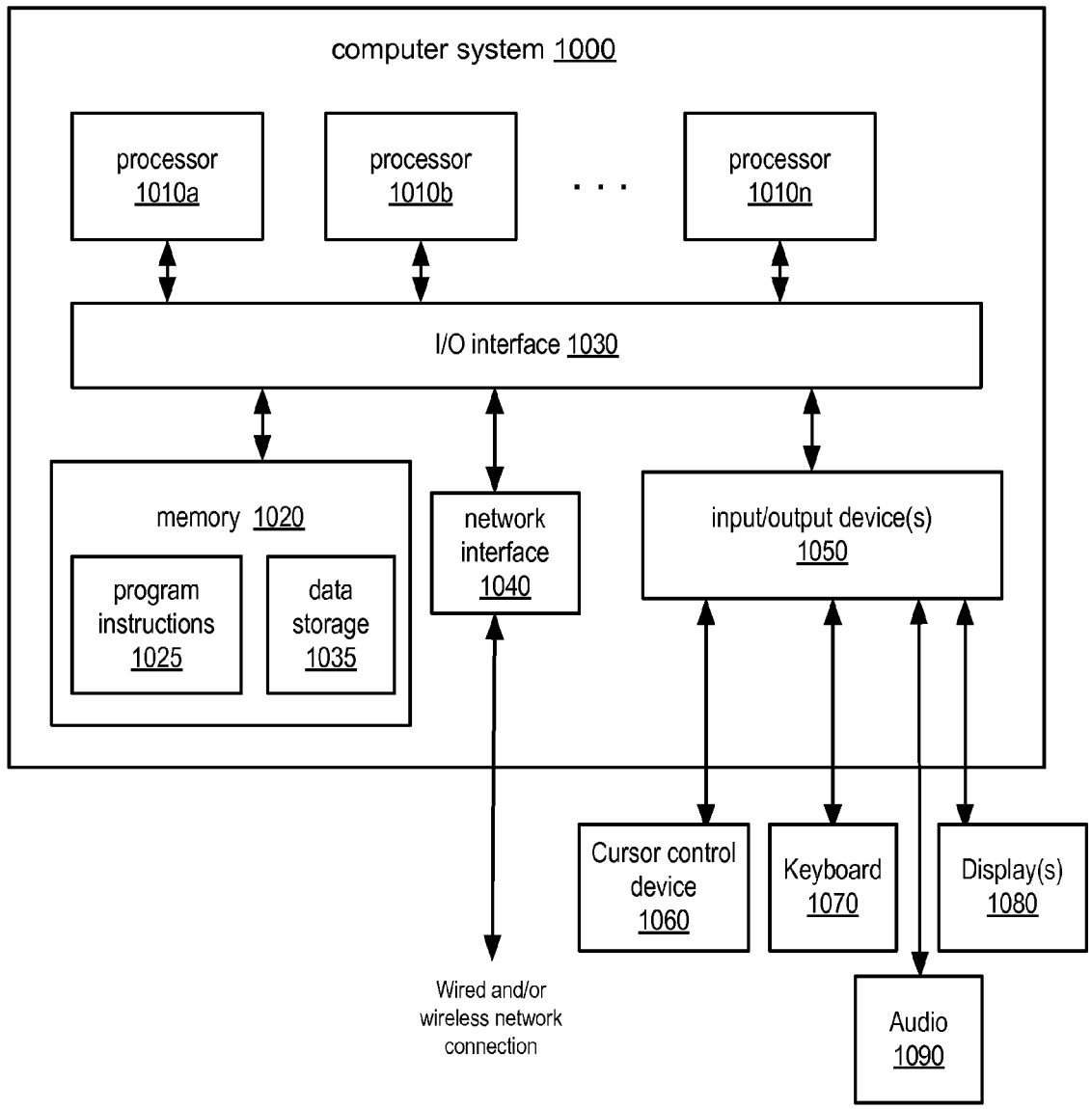
FIG. 10 illustrates an exemplary computer system, according to an embodiment.

Various components of embodiments of the calculation system 105 as described herein may be executed on one or more computer systems, which may interact with various other devices. One such computer system is illustrated by FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, Scalable Processor Architecture (SPARC), or MIPS ISAs, or any other suitable ISA. In multiprocessor systems, each of processors 1010 may commonly, but not necessarily, implement the same ISA.

System memory 1020 may be configured to store program instructions and/or information accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and information implementing desired functions, such as those described above for the calculation system 105, are shown stored within system memory 1020 as program instructions 1025 and information storage 1035, respectively. In other embodiments, program instructions and/or information may be received, sent or stored upon different types of computer-accessible media or on similar media separate from system memory 1020 or computer system 1000. Generally speaking, a computer-accessible medium may include storage media or memory media such as magnetic or optical media, e.g., disk or Compact Disc/Digital Versatile Disc-Read Only Memory (CD/DVD-ROM) coupled to computer system 1000 via I/O interface 1030. Program instructions and information stored via a computer-accessible medium may be transmitted by transmission media or signals such as electrical, electromagnetic, or digital signals, which may be sent via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other information transformations to convert information signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow information to be exchanged between computer system 1000 and other devices attached to a network, such as other computer systems, or between nodes of computer system 1000. In various embodiments, network interface 1040 may support communication via wired or wireless general information networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving information by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement at least a portion of embodiments of the calculation system 105 as described herein, and information storage 1035, comprising various documents, tables, databases, etc. accessible by program instructions 1025. In one embodiment, program instructions 1025 may include software elements of the calculation system 105 illustrated in the Figures, and information storage 1035 may include information used in embodiments of the calculation system 105. In other embodiments, different software elements and information may be included.

Those skilled in the art will appreciate that computer system 1000 is merely illustrative and is not intended to limit the scope of the calculation system 105 as described herein. In particular, the computer system and devices may include any combination of hardware or software that can perform the indicated functions, including computers, network devices, internet appliances, Personal Digital Assistants (PDAs), wireless phones, smart phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and information integrity. Alternatively, in other embodiments some or all of the software components may execute in memory on another device and communicate with the illustrated computer system via inter-computer communication. Some or all of the system components or information structures may also be stored (e.g., as instructions or structured information) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, sent via a communication medium such as a network and/or a wireless link. Various embodiments may further include receiving, sending or storing instructions and/or information implemented in accordance with the foregoing description upon a computer-accessible medium. Accordingly, the present invention may be practiced with other computer system configurations.

Various embodiments may further include receiving, sending or storing instructions and/or information implemented in accordance with the foregoing description upon a computer-accessible medium. Generally speaking, a computer-accessible medium may include storage media or memory media such as magnetic or optical media, e.g., disk or DVD/CD-ROM, Blu-Ray disc, volatile or non-volatile media such as RAM (e.g. SDRAM, Double Data Rate (DDR), RAMBUS Dynamic Random Access Memory (RDRAM), SRAM, etc.), ROM, etc. As well as transmission media or signals such as electrical, electromagnetic, or digital signals, sent via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
   receiving, using a processor, credit card transaction information for a credit card transaction;
   determining, using the processor, one or more characteristics of the transaction based on the credit card transaction information, wherein the one or more characteristics affect a merchant fee for the transaction;
   executing, using the processor, a calculation of the merchant fee before completing the credit card transaction based on the one or more characteristics;
   providing, using the processor, the merchant fee and at least one of the one or more determined characteristics to a merchant before completing the credit card transaction;
   receiving, using the processor, a request from the merchant to reject the transaction based on the merchant fee; and
   rejecting, using the processor, the credit card transaction in response to receiving the request from the merchant.

2. The method of claim 1, wherein the credit card transaction information is at least one of indication of face-to-face transaction, indication of keyed-in transaction, transaction amount, time transaction accepted, time batch closed, or credit card type.

3. The method of claim 1, further comprising:
   providing at least one recommendation to the merchant based on the at least one merchant fee.

4. The method of claim 3, wherein the recommendation comprises a recommendation for when to close a batch of transactions.

5. The method of claim 4, wherein the recommendation is based at least on a fee per batch and a fee or fee change based on a time the batch is closed.

6. The method of claim 1, wherein at least one of the one or more characteristics is whether credit card information during a transaction is swiped or keyed in, the length of time the transaction has been in an open batch, whether address information from the card holder for the transaction was verified, whether an electronic authorization for the transaction was received, whether the merchant is approved to swipe and/or key in the transaction, the time between an authorization date and a shipping date, or the type of credit card.

7. A system, comprising:
   a processor;
   a memory coupled to the processor and configured to store program instructions executable by the processor to:
     receive credit card transaction information for a credit card transaction;
     determine one or more characteristics of the transaction based on the credit card transaction information, wherein the one or more characteristics affect a merchant fee for the transaction;
     execute a calculation of the merchant fee before completing the credit card transaction based on the one or more characteristics;
     provide the merchant fee and at least one of the one or more determined characteristics to a merchant before completing the credit card transaction;
     receive a request from the merchant to reject the transaction based on the merchant fee; and
     reject the credit card transaction in response to receiving the request from the merchant.

8. The system of claim 7, wherein the credit card transaction information is at least one of indication of face-to-face transaction, indication of keyed-in transaction, transaction amount, time transaction accepted, time batch closed, or credit card type.

9. The system of claim 7, wherein the program instructions are further executable to provide at least one recommendation to the merchant based on the at least one merchant fee.

10. The system of claim 7, wherein at least one of the one or more characteristics is whether credit card information during a transaction is swiped or keyed in, the length of time the transaction has been in an open batch, whether address information from the card holder for the transaction was verified, whether an electronic authorization for the transaction was received, whether the merchant is approved to swipe and/or key in the transaction, the time between an authorization date and a shipping date, or the type of credit card.

11. A computer-readable storage medium storing program instructions computer-executable to:
    receive credit card transaction information for a credit card transaction;
    determine one or more characteristics of the transaction based on the credit card transaction information, wherein the one or more characteristics affect a merchant fee for the transaction;
    execute a calculation of the merchant fee before completing the credit card transaction based on the one or more characteristics;

provide the merchant fee and at least one of the one or more determined characteristics to a merchant before completing the credit card transaction;

receive a request from the merchant to reject the transaction based on the merchant fee; and reject the credit card transaction in response to receiving the request from the merchant.

12. The computer-readable storage medium of claim 11, wherein the credit card transaction information is at least one of indication of face-to-face transaction, indication of keyed-in transaction, transaction amount, time transaction accepted, time batch closed, or credit card type.

13. The computer-readable storage medium of claim 11, wherein the program instructions are further executable to provide at least one recommendation to the merchant based on the at least one merchant fee.

14. The computer-readable storage medium of claim 11, wherein at least one of the one or more characteristics is whether credit card information during a transaction is swiped or keyed in, the length of time the transaction has been in an open batch, whether address information from the card holder for the transaction was verified, whether an electronic authorization for the transaction was received, whether the merchant is approved to swipe and/or key in the transaction, the time between an authorization date and a shipping date, or the type of credit card.

15. The method of claim 1, wherein the merchant fee is calculated by a calculation system resident on a credit card terminal of the merchant.

16. The system of claim 7, wherein the merchant fee is calculated by a calculation system resident on a credit card terminal of the merchant.

17. The computer-readable storage medium of claim 11, wherein the merchant fee is calculated by a calculation system resident on a credit card terminal of the merchant.

18. A method, comprising:

receiving, using a processor, credit card transaction information for a credit card transaction;

determining, using the processor, one or more characteristics of the transaction based on the credit card transaction information, wherein the one or more characteristics affect a merchant fee for the transaction;

executing, using the processor, a calculation of the merchant fee before completing the credit card transaction based on the one or more characteristics;

providing, using the processor, the merchant fee and at least one of the one or more determined characteristics to a merchant before completing the credit card transaction;

receiving, using the processor, a request from the merchant to complete the transaction based on the merchant fee; and completing, using the processor, the credit card transaction in response to receiving the request from the merchant.

* * * * *